(12) United States Patent
Handshaw et al.

(10) Patent No.: US 10,803,273 B1
(45) Date of Patent: Oct. 13, 2020

(54) BARCODE READER HAVING ALTERNATING ILLUMINATION FOR A SINGLE SENSOR SPLIT INTO MULTIPLE FOVS

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/685,901

(22) Filed: Nov. 15, 2019

(51) Int. Cl.
  *G06K 5/04* (2006.01)
  *G06K 7/14* (2006.01)
  *H04N 5/225* (2006.01)
  *H04N 5/235* (2006.01)

(52) U.S. Cl.
  CPC ......... *G06K 7/1439* (2013.01); *G06K 7/1413* (2013.01); *H04N 5/2253* (2013.01); *H04N 5/2254* (2013.01); *H04N 5/2256* (2013.01); *H04N 5/2354* (2013.01)

(58) Field of Classification Search
  CPC ..... G06K 7/14; G06K 7/1491; G06K 7/10871
  USPC .................................................... 235/462.12
  See application file for complete search history.

(56) References Cited

U.S. PATENT DOCUMENTS

| | | | |
|---|---|---|---|
| 7,219,843 B2 * | 5/2007 | Havens | G06K 7/10574 235/462.41 |
| 10,534,944 B1 * | 1/2020 | Brock | G06K 7/10881 |
| 10,685,198 B1 * | 6/2020 | Barkan | G06K 7/10732 |
| 2009/0020611 A1 * | 1/2009 | Sackett | G06K 7/1096 235/462.08 |
| 2010/0155487 A1 * | 6/2010 | Liu | G06K 7/10732 235/462.42 |
| 2019/0188434 A1 * | 6/2019 | Drzymala | G06K 7/10861 |

\* cited by examiner

*Primary Examiner* — Ahshik Kim
(74) *Attorney, Agent, or Firm* — Yuri Astvatsaturov

(57) ABSTRACT

A barcode reader having alternating illumination for a single sensor split into multiple fields of view (FOVs) is disclosed herein. An example barcode reader includes an image sensor having a primary FOV and operable at a predetermined framerate, an optical assembly configured to split the primary FOV into first and second subfields of view, an illumination assembly configured to illuminate targets appearing within the first and second subfields of view, a controller, and a decoder. The controller instructs the image sensor to capture a first image with a first exposure duration while having the illumination assembly be activated for at least a portion of the first exposure duration and a second image with a different second exposure duration while having the illumination assembly be activated for at least a portion of the second exposure duration. From the first and second images, the decoder attempts to decode a barcode.

12 Claims, 8 Drawing Sheets

BARCODE READER HAVING ALTERNATING ILLUMINATION FOR A SINGLE SENSOR SPLIT INTO MULTIPLE FOVS

BACKGROUND OF THE INVENTION

Barcode readers with a single image sensor may have disparate image brightness requirements for a generally horizontal window and a generally upright window for a variety of reasons. For example, in some barcode readers, the optical path lengths to the generally horizontal window and the generally upright window of the barcode reader from the single image sensor differ. The distances from respective illumination systems to the generally horizontal window and the generally upright window may vary. Additionally, different types of glass may be used in each window. Further, ambient light may provide better illumination for the generally upright window than for the horizontal window. Since a sole image sensor is used, the disparate image brightness requirements cannot be met by adjusting the exposure of the image sensor as would be possible if more than one image sensor was in use.

SUMMARY

According to a first aspect, a barcode reader comprises an image sensor, an optical assembly, an illumination assembly, a controller, and a decoder. The image sensor has a primary field of view and is operable at a predetermined framerate. The optical assembly is configured to split the primary field of view into a first subfield of view and a second subfield of view. The illumination assembly is configured to illuminate targets appearing within the first subfield of view and the second subfield of view. The controller is communicatively coupled to the image sensor. The controller is configured to instruct the image sensor to capture a first image with a first exposure duration while having the illumination assembly be activated for at least a portion of the first exposure duration. The controller is further configured to instruct the image sensor to capture a second image with a second exposure duration while having the illumination assembly be activated for at least a portion of the second exposure duration, the second exposure duration being different than the first exposure duration. The decoder is configured to receive a portion of the first image obtained by a first set pixels of the image sensor, receive a portion of the second image obtained by a second set of pixels of the image sensor, and attempt to decode a barcode within at least one of the portion of the first image and the portion of the second image.

According to a second aspect, a barcode reader comprises an image sensor, an optical assembly, an illumination assembly, a controller, and a decoder. The image sensor has a primary field of view and is operable at a predetermined framerate. The optical assembly is configured to split the primary field of view into a first subfield of view and a second subfield of view. The illumination assembly is configured to illuminate targets appearing within the first subfield of view and the second subfield of view. The illumination assembly includes a first illumination assembly configured to illuminate the targets appearing within the first subfield of view. The illumination assembly also includes a second illumination assembly configured to illuminate the targets appearing within the second subfield of view. The controller is communicatively coupled to the image sensor. The controller is configured to instruct the image sensor to capture a first image with a first exposure duration while having the illumination assembly be activated for at least a portion of the first exposure duration. The controller is further configured to instruct the image sensor to capture a second image with a second exposure duration while having the illumination assembly be activated for at least a portion of the second exposure duration, the second exposure duration being the same as the first exposure duration. The decoder is configured to receive a portion of the first image obtained by a first set pixels of the image sensor, receive a portion of the second image obtained by a second set of pixels of the image sensor, and attempt to decode a barcode within at least one of the portion of the first image and the portion of the second image.

In some forms, the portion of the first image may be filtered from the first image by the controller. In other forms, the portion of the first image may be filtered from the first image by the image sensor.

In some forms, the illumination assembly may include a first illumination subassembly and a second illumination subassembly, the first illumination subassembly being configured to illuminate the targets appearing within the first subfield of view, the second illumination subassembly being configured to illuminate the targets appearing within the second subfield of view.

In some forms, the first illumination assembly may be further configured to at least partially illuminate the second subfield of view, or the second illumination assembly may be further configured to at least partially illuminate the first subfield of view. The controller may be further configured to one of cause the first illumination subassembly to be inactive for all of the second exposure duration, and cause the second illumination subassembly to be inactive for all of the first exposure duration.

In some forms, the predetermined framerate may be 60 frames per second. The controller may be configured to cause the first illumination subassembly to be active during at least a portion of the first exposure duration and further cause the second illumination subassembly to be active after the first exposure duration and before the second exposure duration. The controller may further be configured to cause the second illumination subassembly to be active during at least a portion of the second exposure duration and further cause the first illumination subassembly to be active after the second exposure duration and before a third exposure duration.

In some forms, the third exposure duration may sequentially follow the second exposure duration, and the second exposure duration may sequentially follow the first exposure duration.

In some forms, the controller may be configured to cause the second illumination subassembly to be inactive for at least some portion of the first exposure duration. The controller may further be configured to cause the first illumination subassembly to be inactive for at least some portion of the second exposure duration.

In some forms, the barcode reader may be a bi-optic barcode reader having a lower housing portion with a horizontal window and a upper housing portion with an upright window, wherein the first subfield of view passes through the horizontal window, and wherein the second subfield of view passes through the upright window.

In some forms, the first subfield of view may be configured to capture image data associated with a non-direct-part marking (DPM) barcode, and the second subfield of view may be configured to capture image data associated with the DPM barcode.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
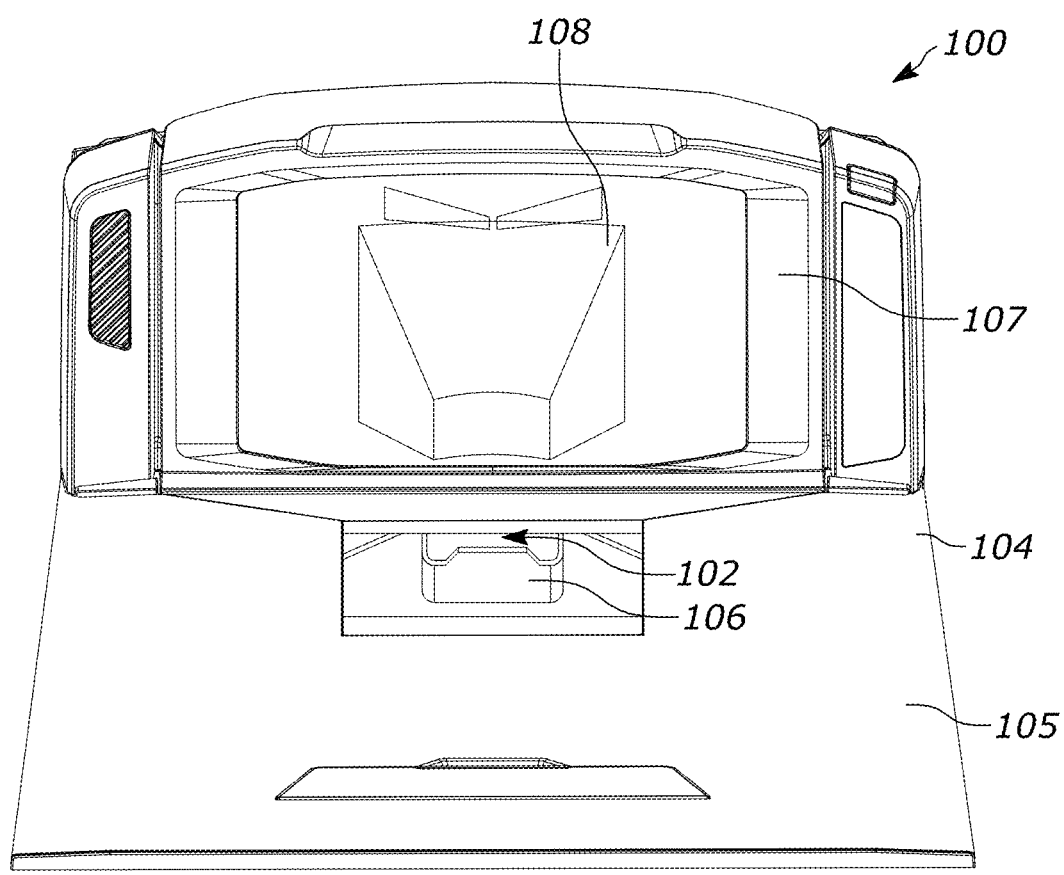
FIG. 1 is a front isometric view of a barcode reader of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, as shown in FIG. 1, a barcode reader 100 is shown. The barcode reader 100 may be a bioptic barcode reader. The barcode reader 100 is used to capture images of targets presented in a product-scanning region 102. The barcode reader 100 has a housing 104 having a lower housing portion 105 that supports a generally horizontal window 106 and an upper housing portion 107 that supports a generally upright window 108. For purposes of this specification, a generally horizontal window 106 may be positioned up to and including 45 degrees above or below a horizontal plane. For purposes of this specification, a generally upright window 108 may be positioned up to and including 45 degrees in front or behind a vertical plane. In the barcode reader 100 shown in FIG. 1, the generally horizontal window 106 is perpendicular to the generally vertical window 108. However, in other arrangements not herein depicted, the generally horizontal window 106 may be at an obtuse angle or an acute angle relative to the generally vertical window 108.

Figure 2:
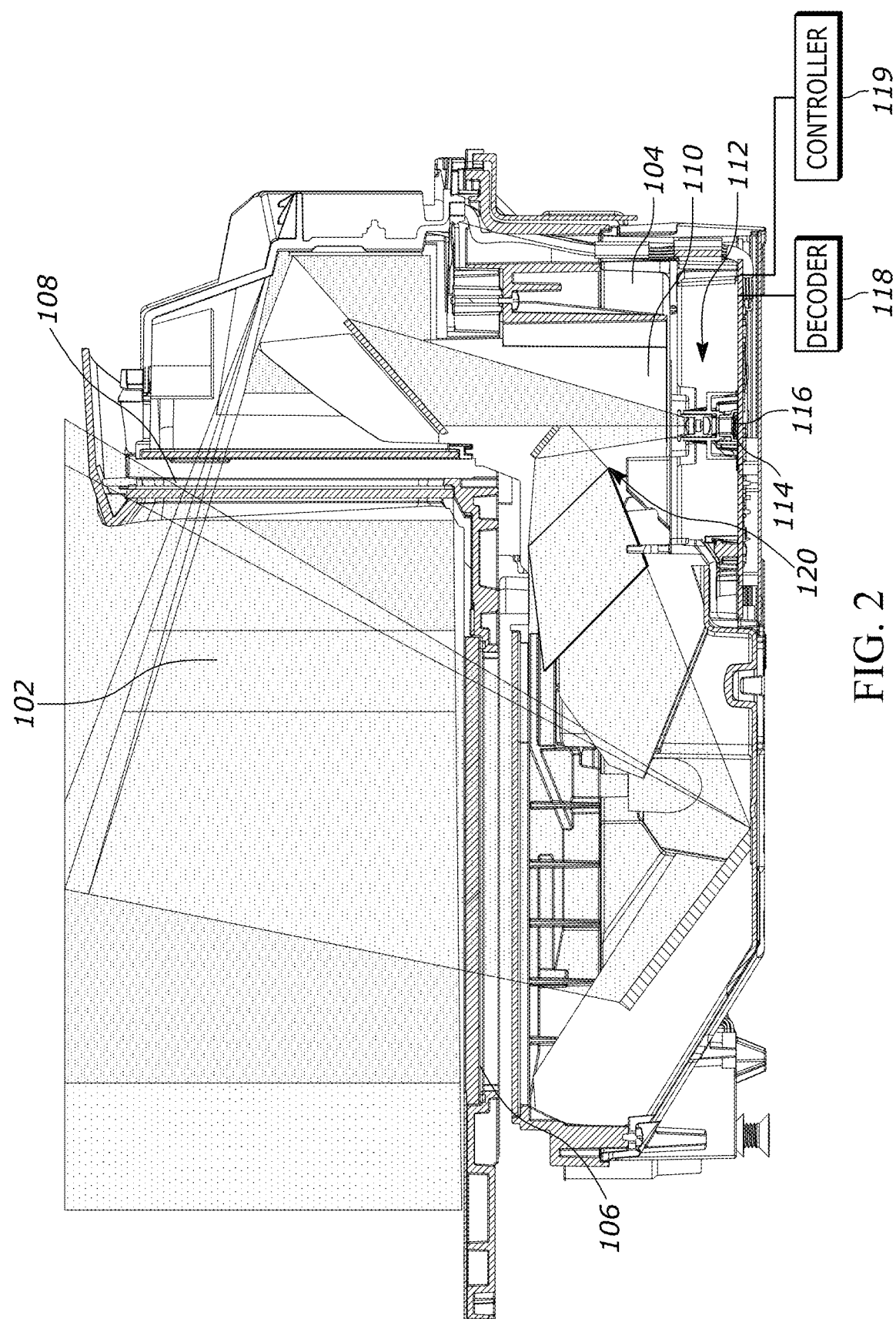
FIG. 2 is a side cross-sectional view of the barcode reader of FIG. 1.

As shown in FIG. 2, the housing 104 of the barcode reader 100 has an interior region 110. The generally horizontal window 106 is configured to allow a first light to pass between the product-scanning region 102 and the interior region 110 of the housing 104. The generally upright window 108 is configured to allow a second light to pass between the product-scanning region 102 and the interior region 110 of the housing 104. An imaging assembly 112 is provided in the interior region 108. The imaging assembly 112 includes a single image sensor 114. The image sensor 114 has a plurality of photosensitive elements forming a substantially flat surface 116. A decoder 118 (shown schematically) is communicatively coupled to the imaging assembly 112 and, specifically, the image sensor 114. The decoder 118 is configured to decode a barcode captured in an image by the image sensor 114. Only imaging assembly 112 is communicatively coupled to the decoder 118 and used to process images for decoding indicia. No other imaging assembly 112 in the barcode reader 100 does this. A controller 119 (discussed in greater detail below with respect to FIG. 7) is also communicatively coupled to the image sensor.

As also shown in FIG. 2, an optical assembly 120 is positioned within the interior region 110 of the housing 104. The image sensor 114 has a primary field of view (FOV) and is operable at a predetermined framerate. The predetermined framerate may, for example, be set at 60 frames per second. The optical assembly 120 is configured to divide the primary FOV into at least a first subfield of view and a second subfield of view. In some arrangements, the optical assembly 120 then redirects the first subfield of view through the generally horizontal window 106 and redirects the second subfield of view through the generally upright window 108. The first subfield of view is configured to capture image data associated with a non-direct-part marking (DPM) barcode. The second subfield of view is also configured to capture image data associated with the DPM barcode.

The optical assembly 120 may divide the primary FOV into more than two subfields. For example, as discussed below, the optical assembly may divide the primary FOV into subfield one, subfield two, subfield three, and subfield four. For purposes of this disclosure, the terms "first subfield of view" and "second subfield of view" may refer to single subfields or to a collection of more than one subfield. For example, "first subfield of view" may refer to subfield three and subfield four collectively, or "first subfield of view" may refer to subfield three or subfield four alone. Similarly, "second subfield of view" may refer to subfield one and subfield two collectively, or "second subfield of view" may refer to subfield one or subfield two alone. Other combinations of subfields, or identification of single subfields, also fall within the potential definitions of "first subfield" and "second subfield."

Figure 3:
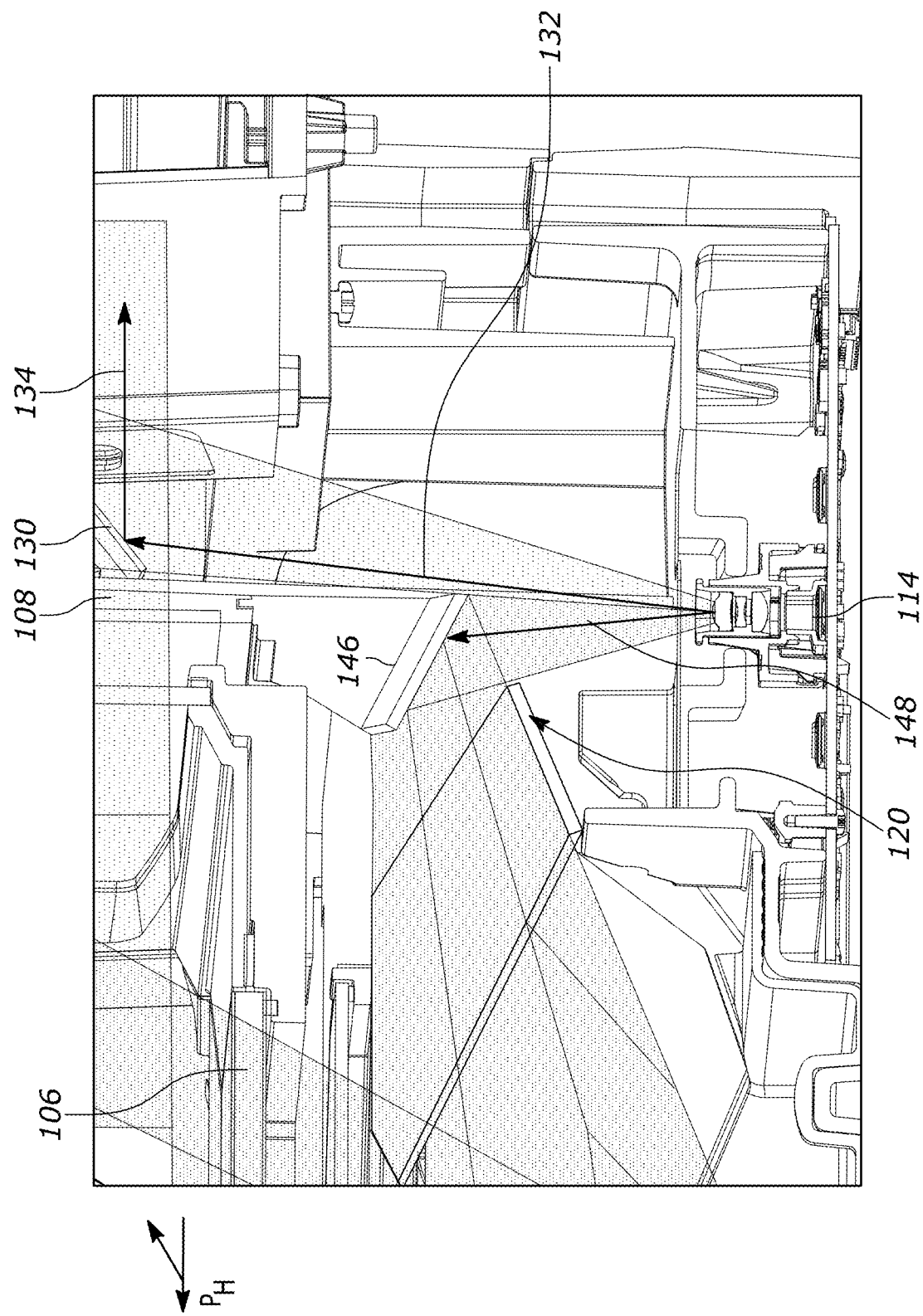
FIG. 3 is an enlarged side cross-sectional view of the barcode reader of FIGS. 1 and 2.
Figure 4:
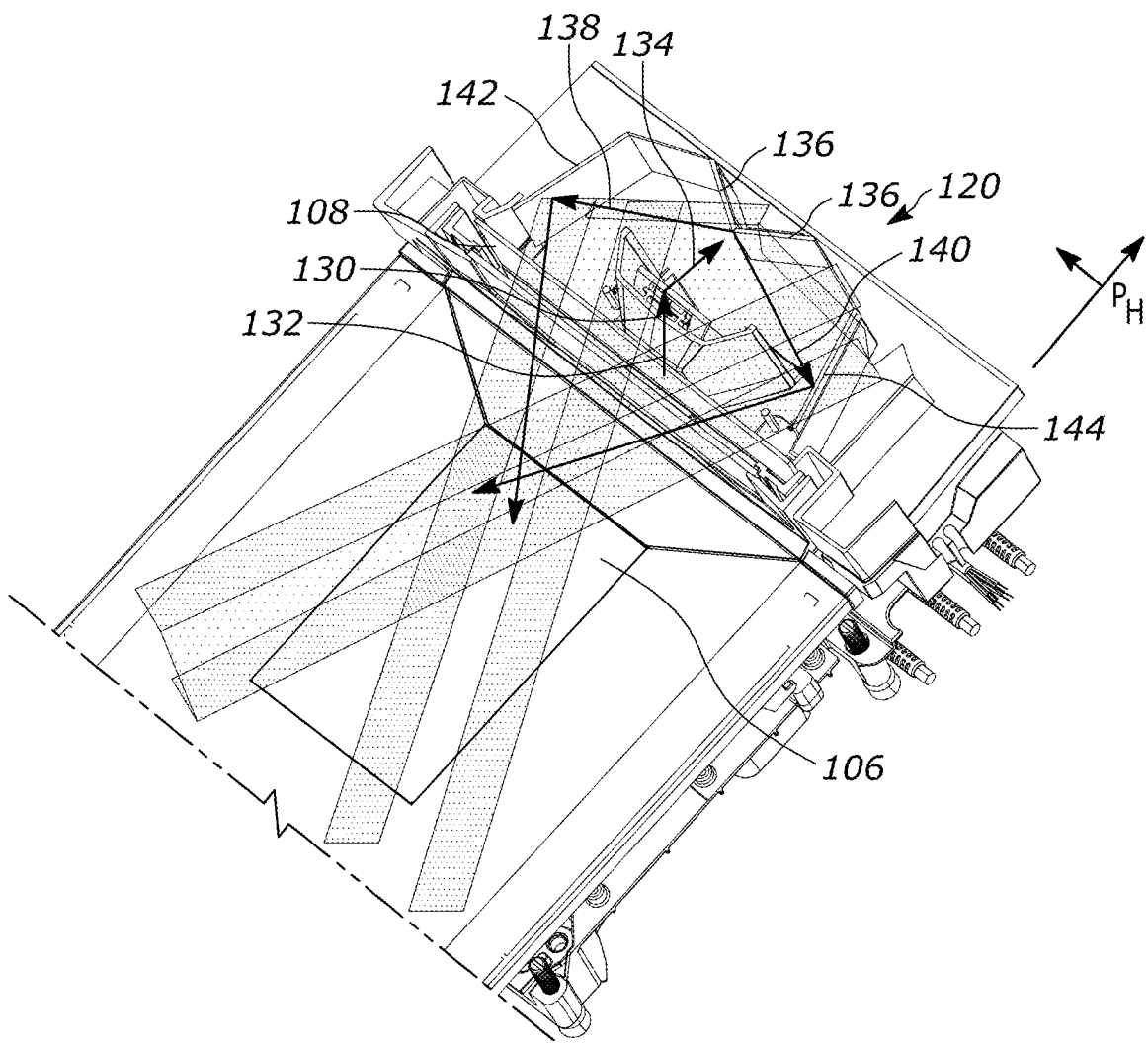
FIG. 4 is a top cutaway view of the imaging assembly pathways associated with a generally upright window of the barcode reader of FIGS. 1-3.

FIG. 3 and FIG. 4 together show the paths of the optical assembly 120 from the image sensor 114 to the generally upright window 108. As shown in FIGS. 3 and 4, the optical assembly 120 has a first fold mirror 130 positioned directly within a first path 132 of a first portion of the primary FOV. The first fold mirror 130 redirects the first portion of the primary FOV from the first path 132 to a second path 134. Referring now exclusively to FIG. 4, a first set of splitter mirrors 136 is positioned directly within the second path 134. More specifically, as shown, the first set of splitter mirrors 136 is located above a plane $P_H$ defined by the generally horizontal window 106 relative to the imaging assembly 112. The first set of splitter mirrors 136 splits the first portion of the primary FOV into subfield one and subfield two. Subfield one is directed by the first set of splitter mirrors 136 along a third path 138. Subfield two is directed by the first set of splitter mirrors 136 along a fourth path 140. A second fold mirror 142 is positioned directly within the third path 138 and redirects subfield one through the generally upright window 108. A third fold mirror 144 is positioned directly within the fourth path 140 and redirects subfield two through the generally upright window 108. As shown in FIG. 4, upon being redirected by the first set of splitter mirrors 136, subfield one and subfield two at least partially overlap.

Figure 5:
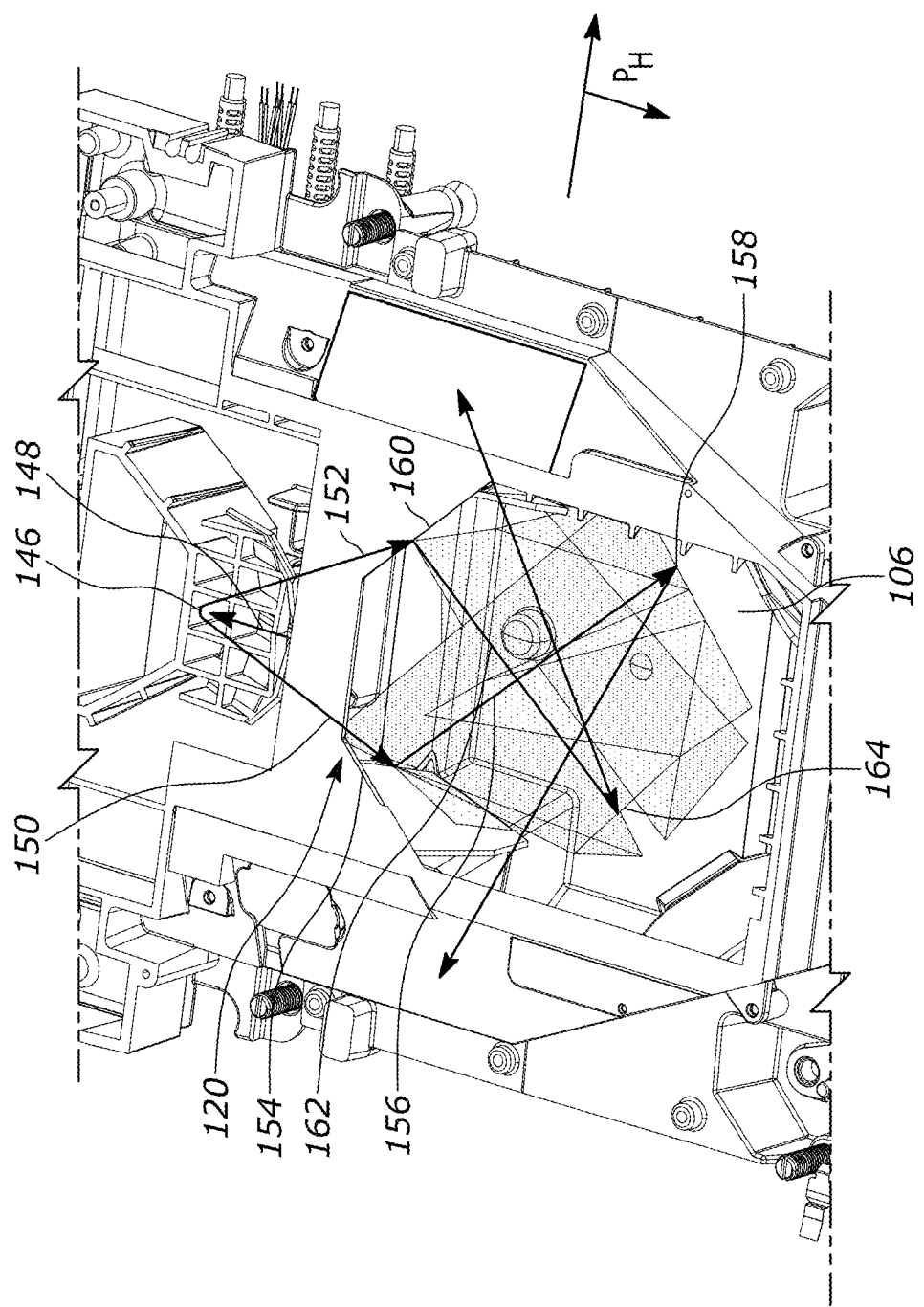
FIG. 5 is a top cutaway view of the imaging assembly pathways associated with the generally horizontal window of the barcode reader of FIGS. 1-4.
Figure 6:
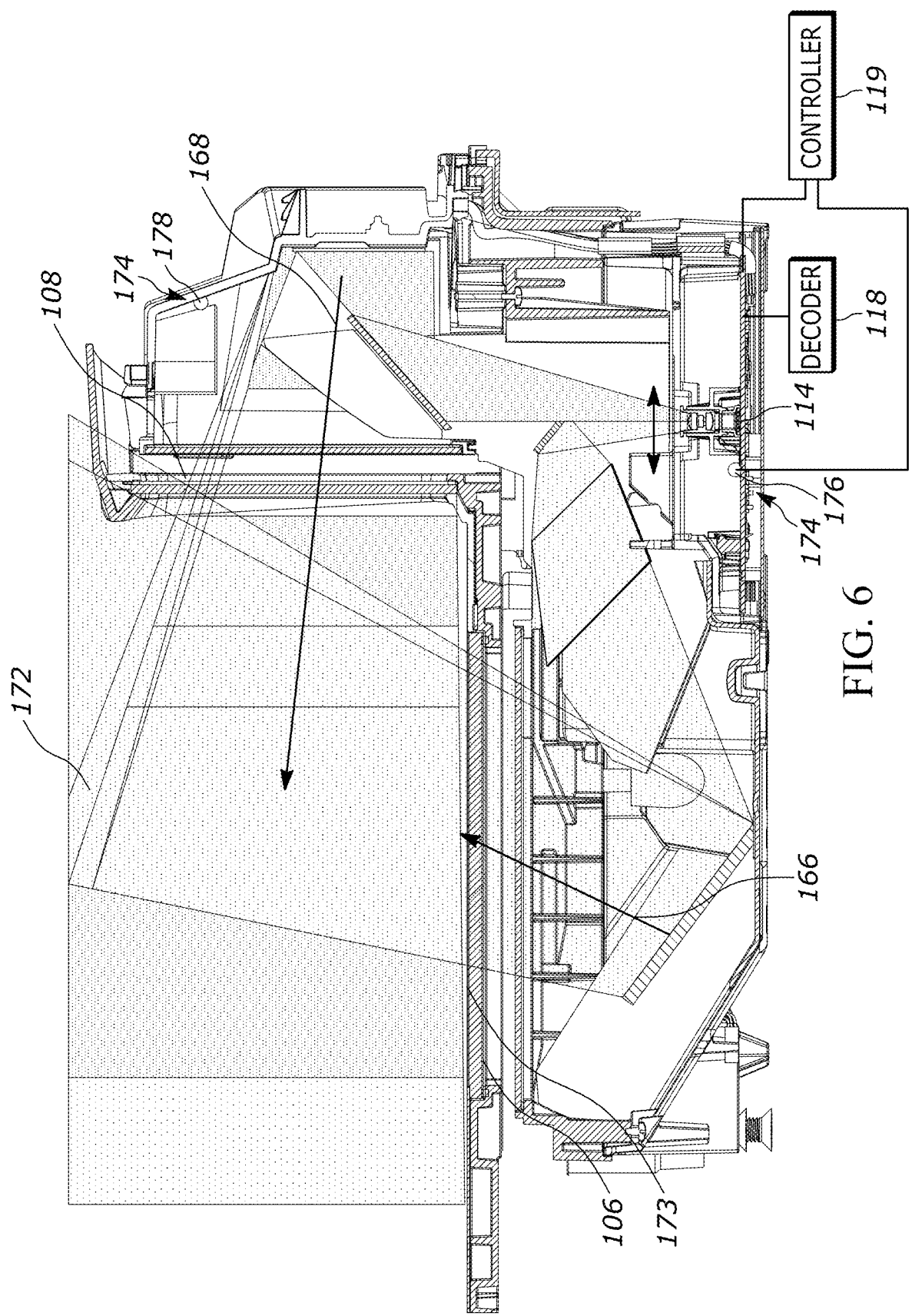
FIG. 6 is a side cross-sectional view of the bioptic reader of FIGS. 1-5 illustrating optical lengths from the image sensor to the generally horizontal window and the generally upright window.

FIG. 3 and FIG. 5 together show the paths of the optical assembly 120 from the image sensor 114 to the generally horizontal window 106. As shown in FIGS. 4 and 6, a second set of splitter mirrors 146 is positioned directly within a fifth path 148 of a second portion of the primary FOV. The second set of splitter mirrors 146 is located below the plane $P_H$ defined by the generally horizontal window 106 relative to the imaging assembly 112. The second set of splitter mirrors 146 slits the second portion of the primary FOV into subfield three and a subfield four. Referring now exclusively to FIG. 6, the second set of splitter mirrors 146 redirects subfield three along a sixth path 150 and redirects subfield four along a seventh path 152. A fourth fold mirror 154 is positioned directly within the sixth path 150 and redirects subfield three along an eighth path 156. A fifth fold mirror 158 is positioned directly within the eighth path 156 and redirects subfield three through the generally horizontal window 106. A sixth fold mirror 160 is positioned directly within the seventh path 152 and redirects subfield four along a ninth path 162. A seventh fold mirror 164 is positioned directly within the ninth path 162 and redirects subfield four through the generally horizontal window 106. As shown in FIG. 5, upon being redirected by the second set of splitter mirrors 146, subfield three and subfield four at least partially overlap.

FIG. 6 shows the relative optical lengths from the image sensor 114 to the generally horizontal window 106 and the generally upright window 108. A first optical length 166 (partially depicted in FIG. 6) extends from the image sensor 114 to the generally horizontal widow 106. The first optical length 166 is measured along the primary FOV and either subfield three or subfield four, both of which pass through the generally horizontal window 106. Here, subfield three and/or subfield four constitute the first subfield of view. A second optical length 168 (partially depicted in FIG. 6) extends from the image sensor 114 to the generally upright window 108. The second optical length 168 is measured along the primary FOV and either subfield one or subfield two, both of which pass through the generally upright window 108. Here, subfield one and/or subfield two constitute the second subfield of view. The first optical length 166 is different than the second optical length 168. Specifically, the first optical length 166 is longer than the second optical length 168. The first optical length 166 and the second optical length 168 can be adjusted by moving the image sensor 114 forward or backward. This allows a vertical focus distance 172 and a horizontal focus distance 173 to be determined. For example, the horizontal focus distance 173 may be set at the generally horizontal window 106 and the window may be located above the generally horizontal window 106 approximately one-third of the way across the generally horizontal window 106 from the generally upright window 108.

To illuminate targets appearing within the first subfield of view and the second subfield of view, an illumination assembly 174 is provided. The illumination assembly includes a first illumination subassembly 176 and a second illumination subassembly 178. The first illumination subassembly 176 is configured to illuminate the targets appearing within the first subfield of view. The second illumination subassembly 178 is configured to illuminate targets appearing within the second subfield of view. The first illumination subassembly 176 may be further configured to at least partially illuminate the second subfield of view, and the second illumination subassembly 178 may further be configured to at least partially illuminate the first subfield of view. As discussed in greater detail below, the illumination assembly 174 is selectively activated by the controller 119 for certain periods of time when the controller 119 instructs the image sensor 114 to capture images.

Figure 7:
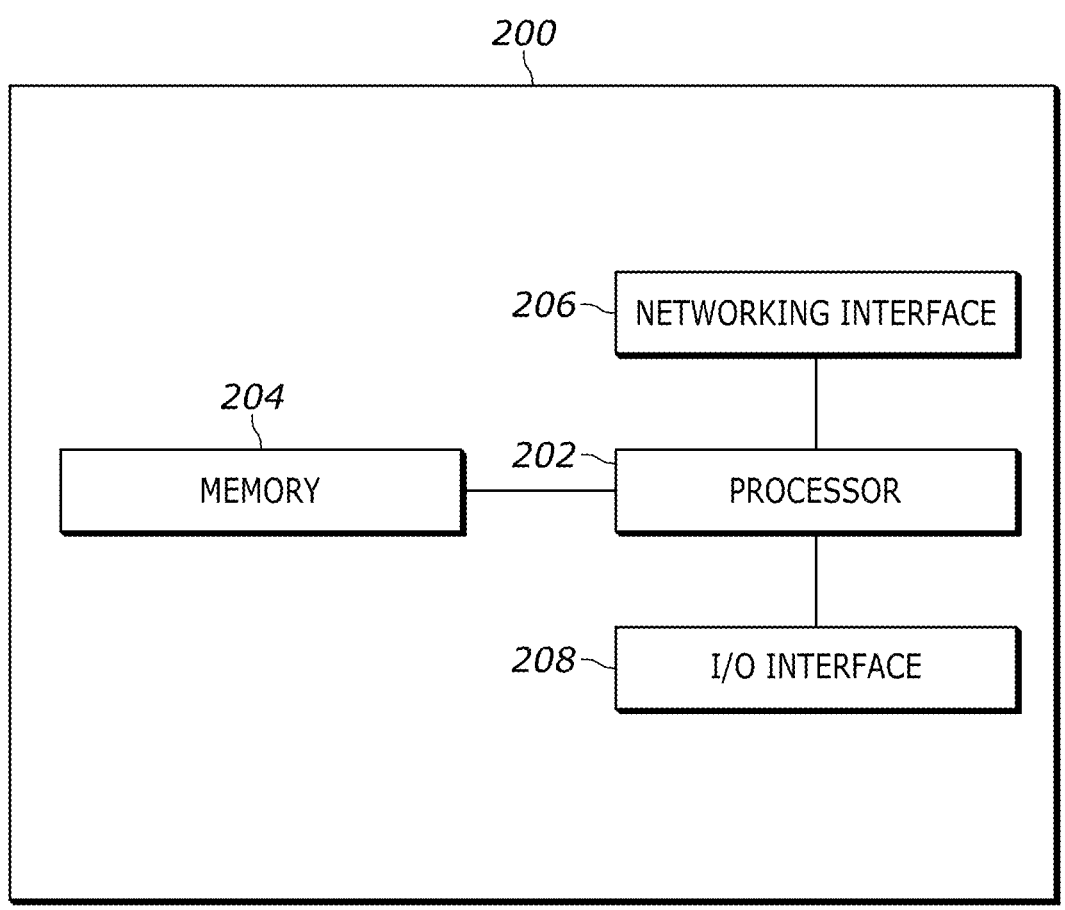
FIG. 7 is a schematic view of a controller of a barcode reader of the present disclosure.

FIG. 7 is a block diagram representative of an example logic circuit capable of implementing, for example, one or more steps of the example method 300 of FIG. 8, discussed below, or, more generally, the example controller 119 of FIG. 6. The example logic circuit of FIG. 7 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 7 includes a processor 202 such as, for example, one or more microprocessors, controllers, and/or any suitable type of processor. The example processing platform 200 of FIG. 7 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 7 also includes a network interface 206 to enable communication with other machines via, for example, one or more networks. The example network interface 206 includes any suitable type of communication interface(s) (e.g., wired and/or wireless interfaces) configured to operate in accordance with any suitable protocol(s). The example, processing platform 200 of FIG. 7 also includes input/output (I/O) interfaces 208 to enable receipt of user input and communication of output data to the user.

Figure 8:
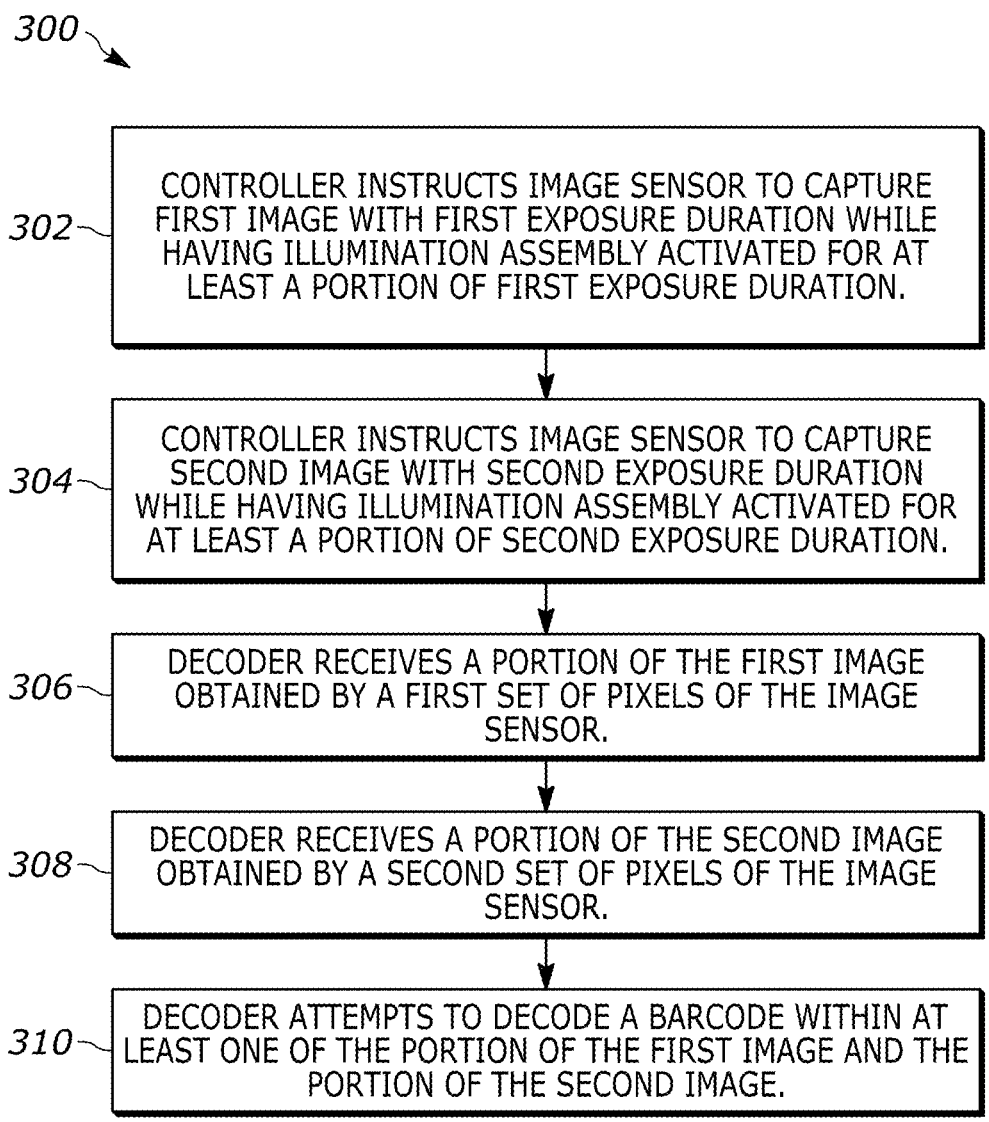
FIG. 8 illustrates a method of operation of a barcode reader of the present disclosure.

FIG. 8 illustrates a method 300 of using the barcode reader 100 to attempt to decode a barcode. At box 302, the controller 119 instructs the image sensor 114 to capture a first image with a first exposure duration while having the illumination assembly 174 be activated for at least a portion of the first exposure duration. At box 304, the controller 119 instructs the image sensor 114 to capture a second image with a second exposure duration while having the illumination assembly 174 be activated for at least a portion of the second exposure duration. The second exposure duration may be different than the first exposure duration or may be the same as the first exposure duration. More specifically, at box 302, the controller 119 may cause the first illumination subassembly 176 to be active during at least a portion of the first exposure duration and further cause the second illumination subassembly 178 to be active after the first exposure duration and before the second exposure duration. Further, at box 302, the controller 119 may cause the second illumination subassembly 178 to be inactive for at least some portion of the first exposure duration. When the second illumination assembly 178 is configured to at least partially illuminate the first subfield of view, the controller 119 may cause the second illumination subassembly 178 to be inactive for all of the first exposure duration. At box 304, the controller 119 may cause the second illumination subassembly 178 to be active during at least a portion of the second exposure duration and further cause the first illumination subassembly 176 to be active after the second exposure duration and before a third exposure duration. Further, at box 204, the controller 119 may cause the first illumination subassembly 176 to be inactive for at least some portion of the second exposure duration. When the first illumination assembly 176 is configured to at least partially illuminate the second subfield of view, the controller 119 may cause the first illumination assembly 176 to be inactive for all of the second exposure duration. The second exposure duration sequentially follows the first exposure duration, and the third exposure duration sequentially follows the second exposure duration.

The method 300 also includes actions undertaken by decoder 118. At box 306, the decoder 118 receives a portion of the first image obtained by a first set pixels of the image sensor. At box 308, the decoder 118 receives a portion of the second image obtained by a second set of pixels of the image sensor. At box 310, the decoder 118 attempts to decode a barcode within at least one of the portion of the first image and the portion of the second image The barcode reader 100, which can implement method 300 above, is able to provide adequate illumination for image capture and barcode decoding even when the optical path lengths to the generally horizontal window 106 and the generally upright window 108 are different. Likewise, the barcode reader 100 provides adequate illumination when the glass used in the generally horizontal window 106 and generally upright window 108 varies, or when the ambient light striking the generally horizontal window 106 differs from the ambient light striking the generally upright window 108. Addressing these issues facilitates the use of only one image sensor 114 in the barcode reader 100, as opposed to multiple image sensors, thereby reducing the cost and complexity of the barcode reader 100.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader comprising:
   an image sensor having a primary field of view, the image sensor operable at a predetermined framerate;
   an optical assembly configured to split the primary field of view into a first subfield of view and a second subfield of view;
   an illumination assembly configured to illuminate targets appearing within the first subfield of view and the second subfield of view;
   a controller communicatively coupled to the image sensor, the controller configured to:
      instruct the image sensor to capture a first image with a first exposure duration while having the illumination assembly be activated for at least a portion of the first exposure duration, and
      instruct the image sensor to capture a second image with a second exposure duration while having the illumination assembly be activated for at least a portion of the second exposure duration, the second exposure duration being different than the first exposure duration; and
   a decoder configured to:
      receive a portion of the first image obtained by a first set pixels of the image sensor,
      receive a portion of the second image obtained by a second set of pixels of the image sensor, and
      attempt to decode a barcode within at least one of the portion of the first image and the portion of the second image.

2. The barcode reader of claim 1, wherein the portion of the first image is filtered from the first image by the controller.

3. The barcode reader of claim 1, wherein the portion of the first image is filtered from the first image by the image sensor.

4. The barcode reader of claim 1, wherein the illumination assembly includes a first illumination subassembly and a second illumination subassembly, the first illumination subassembly being configured to illuminate the targets appearing within the first subfield of view, the second illumination subassembly being configured to illuminate the targets appearing within the second subfield of view.

5. The barcode reader of claim 4, wherein:
   the predetermined framerate is 60 frames per second; and
   the controller is further configured to:
      cause the first illumination subassembly to be active during at least a portion of the first exposure duration and further cause the second illumination subassembly to be active after the first exposure duration and before the second exposure duration; and
      cause the second illumination subassembly to be active during at least a portion of the second exposure duration and further cause the first illumination subassembly to be active after the second exposure duration and before a third exposure duration.

6. The barcode reader of claim 5, wherein the third exposure duration sequentially follows the second exposure duration, and wherein the second exposure duration sequentially follows the first exposure duration.

7. The barcode reader of claim 5, wherein the controller is further configured to:
   cause the second illumination subassembly to be inactive for at least some portion of the first exposure duration; and
   cause the first illumination subassembly to be inactive for at least some portion of the second exposure duration.

8. The barcode reader of claim 1, wherein the barcode reader is a bi-optic barcode reader having a lower housing portion with a generally horizontal window and a upper housing portion with a generally upright window, wherein the first subfield of view passes through the generally horizontal window, and wherein the second subfield of view passes through the generally upright window.

9. The barcode reader of claim 1, wherein the first subfield of view is configured to capture image data associated with a non-direct-part marking (DPM) barcode, and wherein the second subfield of view is configured to capture image data associated with the DPM barcode.

10. The barcode reader of claim 4,
wherein one of the first illumination assembly is further configured to at least partially illuminate the second subfield of view, and the second illumination assembly is further configured to at least partially illuminate the first subfield of view; and
wherein the controller is further configured to one of cause the first illumination subassembly to be inactive for all of the second exposure duration, and cause the second illumination subassembly to be inactive for all of the first exposure duration.

11. The barcode reader of claim 10,
wherein one of the first illumination assembly is further configured to at least partially illuminate the second subfield of view, and the second illumination assembly is further configured to at least partially illuminate the first subfield of view; and
wherein the controller is further configured to one of cause the first illumination subassembly to be inactive for all of the second exposure duration, and cause the second illumination subassembly to be inactive for all of the first exposure duration.

12. A barcode reader comprising:
an image sensor having a primary field of view, the image sensor operable at a predetermined framerate;
an optical assembly configured to split the primary field of view into a first subfield of view and a second subfield of view;
an illumination assembly configured to illuminate targets appearing within the first subfield of view and the second subfield of view, the illumination assembly including a first illumination subassembly and a second illumination subassembly, the first illumination subassembly being configured to illuminate the targets appearing within the first subfield of view, the second illumination subassembly being configured to illuminate the targets appearing within the second subfield of view;
a controller communicatively coupled to the image sensor, the controller configured to:
instruct the image sensor to capture a first image with a first exposure duration while having the illumination assembly be activated for at least a portion of the first exposure duration, and
instruct the image sensor to capture a second image with a second exposure duration while having the illumination assembly be activated for at least a portion of the second exposure duration, the second exposure duration being the same as the first exposure duration; and
a decoder configured to:
receive a portion of the first image obtained by a first set pixels of the image sensor,
receive a portion of the second image obtained by a second set of pixels of the image sensor, and
attempt to decode a barcode within at least one of the portion of the first image and the portion of the second image.

* * * * *